United States Patent
Horner et al.

(10) Patent No.: US 11,603,206 B2
(45) Date of Patent: Mar. 14, 2023

(54) CABIN PRESSURE CONTROL SYSTEM WITH ALL-ELECTRIC OFV, USING DIS-SIMILAR MANUAL CONTROL THAT PERFORMS CABIN ALTITUDE HOLD FUNCTION

(71) Applicant: Honeywell International Inc., Morris Plains, NJ (US)

(72) Inventors: Darrell W. Horner, Oro Valley, AZ (US); David Buck, Oro Valley, AZ (US); Robert William Olson, Tucson, AZ (US); Gerard McCoy, Tucson, AZ (US)

(73) Assignee: Honeywell International Inc., Charlotte, NC (US)

( * ) Notice: Subject to any disclaimer, the term of this patent is extended or adjusted under 35 U.S.C. 154(b) by 476 days.

(21) Appl. No.: 16/804,843

(22) Filed: Feb. 28, 2020

(65) Prior Publication Data
US 2020/0298979 A1 Sep. 24, 2020

Related U.S. Application Data

(60) Provisional application No. 62/822,168, filed on Mar. 22, 2019.

(51) Int. Cl.
*B64D 13/04* (2006.01)
*B64D 13/00* (2006.01)

(52) U.S. Cl.
CPC ........ *B64D 13/04* (2013.01); *B64D 2013/003* (2013.01)

(58) Field of Classification Search
CPC . B64D 13/02; B64D 13/04; B64D 2013/0603

USPC .............................................. 454/71, 74, 76
See application file for complete search history.

(56) References Cited

U.S. PATENT DOCUMENTS

| 2,585,295 | A | * | 2/1952 | Baak | B64D 13/04 |
| | | | | | 454/71 |
| 5,520,578 | A | | 5/1996 | Bloch et al. | |
| 6,737,988 | B2 | | 5/2004 | Horner et al. | |
| 6,979,257 | B2 | * | 12/2005 | Horner | G05D 16/202 |
| | | | | | 454/74 |
| 8,694,181 | B2 | * | 4/2014 | Horner | B64D 13/00 |
| | | | | | 701/3 |

(Continued)

FOREIGN PATENT DOCUMENTS

WO 2005/070764 A1 8/2005

OTHER PUBLICATIONS

Response to Extended Search Report dated Aug. 17, 2020, from counterpart European Application No. 20163458.1, filed Dec. 7, 2020, 46 pp.

(Continued)

*Primary Examiner* — Ko-Wei Lin
(74) *Attorney, Agent, or Firm* — Shumaker & Sieffert, P.A.

(57) ABSTRACT

The disclosure is directed to an independent manual control system of an all-electric cabin pressure control system (CPCS). The manual control system may include a momentary electrical switch to manually set the position of an outflow valve (OFV) along with a closed loop control to hold the cabin pressure at the pressure setpoint. The closed loop control of the manual control system is independent from the automatic pressure control functions of the all-electric CPCS.

19 Claims, 8 Drawing Sheets

(56) References Cited

U.S. PATENT DOCUMENTS

| | | |
|---|---|---|
| 8,808,072 B2 | 8/2014 | Horner et al. |
| 8,864,559 B2 | 10/2014 | Horner et al. |
| 9,783,306 B2 | 10/2017 | Horner et al. |
| 2005/0227605 A1 | 10/2005 | Whitney et al. |
| 2006/0019594 A1 | 1/2006 | Horner et al. |
| 2008/0233854 A1 | 9/2008 | Horner et al. |
| 2019/0106218 A1* | 4/2019 | Parkin .................... B64D 13/04 |

OTHER PUBLICATIONS

Extended Search Report from counterpart European Application No. 20163458.1, dated Aug. 17, 2020, 11 pp.

Intent to Grant dated Jul. 8, 2021, from counterpart European Application No. 20163458.1, 7 pp.

Ping et al., "Failure analysis of aircraft cabin pressure control system," School of Aeronautical Science & Engineering, Beijing University of Aeronautics and Astronautics, IEEE, Applicant points out, in accordance with MPEP 609.04(a), that the year of publication, 2011, is sufficiently earlier than the effective U.S. filing date, so that the particular month of publication is not in issue, 4 pp.

U.S. Appl. No. 16/361,513, by Honeywell International Inc. (Inventor: Horner), filed Mar. 22, 2019.

\* cited by examiner

CABIN PRESSURE CONTROL SYSTEM WITH ALL-ELECTRIC OFV, USING DIS-SIMILAR MANUAL CONTROL THAT PERFORMS CABIN ALTITUDE HOLD FUNCTION

This application claims the benefit of U.S. Provisional Application 62/822,168, filed Mar. 22, 2019, the entire content of which is incorporated herein by reference.

TECHNICAL FIELD

The disclosure relates to aircraft cabin air pressure control.

BACKGROUND

Aircraft may have a pressurized cabin to provide comfort and sufficient oxygen to a flight crew as well as passengers. In some examples, bleed air from the aircraft engines, or an engine driven air pump, may provide pressure to the aircraft interior. An outflow valve (OFV) may be used to release pressure from inside the cabin to the atmosphere to keep the internal cabin pressure within a desirable range. Some aircraft are equipped with a cabin pressure control system (CPCS) to maintain the cabin pressure altitude to within a relatively comfortable range (e.g., below approximately 8,000 feet). The CPCS may automatically allow gradual changes in the cabin pressure altitude to keep passengers and crew comfortable and maintain a cabin-to-atmosphere differential pressure below nominal and maximum limits.

SUMMARY

In general, the disclosure is directed to an independent manual control system of an all-electric cabin pressure control system (CPCS). The manual control system may include a momentary electrical switch to manually set the position of an outflow valve (OFV) along with a closed loop control to hold the cabin pressure at the pressure setpoint. The closed loop control of the manual control system is independent from the automatic pressure control functions of the all-electric CPCS.

In one example, the disclosure describes a cabin air pressure control system, the system comprising: an outflow valve (OFV) configured to release pressure from a cabin; an electric motor configured to control a position of the OFV; an electric switch configured to control an electric motor; processing circuitry configured to: receive a signal indicating a pressure of the cabin; in response to the electric switch being set to a hold position, determine a cabin pressure setpoint; and control the electric motor to adjust the position of the OFV to maintain the pressure of the cabin based on the cabin pressure setpoint.

In another example, the disclosure describes a device for regulating a cabin pressure on an aircraft, the device comprising: first circuitry configured to receive a pressure sense signal from a space within the aircraft; motor drive circuitry configured to control the position of an electric motor, wherein the electric motor controls a position of an outflow valve (OFV); second circuitry configured to receive a motor control signal from an electric switch; processing circuitry operatively connected to a memory, the processing circuitry configured to: receive a signal indicating a pressure of the cabin; in response to receiving a motor control signal from the electric switch indicating a hold position; determine a cabin pressure setpoint; control the electric motor to adjust the position of the OFV to maintain the cabin pressure on the aircraft based on the cabin pressure setpoint.

In another example, the disclosure describes a method for controlling a pressure in a vehicle cabin, the method comprising: receiving, by processing circuitry, a cabin pressure signal indicating a pressure in a cabin; receiving, by the processing circuitry, an electric motor control signal; changing, by the processing circuitry, a position of an electric motor based on the electric motor control signal, wherein the position of the electric motor controls a position of an outflow valve (OFV); in response to receiving a hold position setting from the electric motor control signal, determining, by the processing circuitry, a cabin pressure setpoint; controlling, by the processing circuitry, the position of the electric motor to maintain the pressure in the vehicle cabin at the cabin pressure setpoint.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
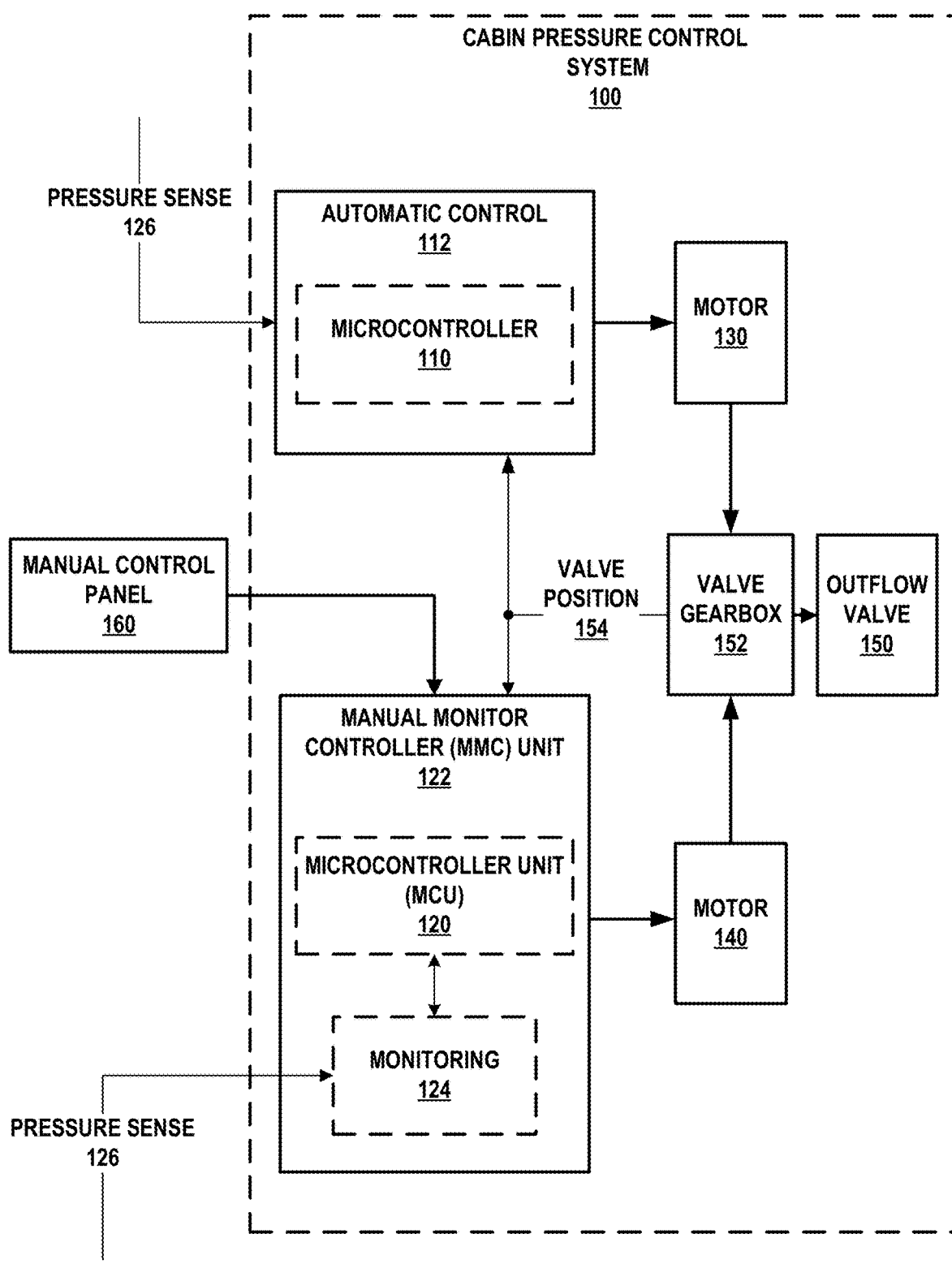
FIG. 1 is a block diagram illustrating an example of a CPCS according to one or more techniques of this disclosure.

Some types of all-electric cabin pressure control system (CPCS) may be configured to implement various techniques to provide "manual" control in response to a fault in the automatic control portion of the CPCS. In a first example, after a fault in the automatic pressure control system, the outflow valve (OFV) may remain in its last position because of the gear box design. A second or third manual controlled motor on the OFV may be operated by a switch in the flight deck, to open or close the OFV.

When the OFV is in its fixed position, the actual cabin altitude can drift or fluctuate as a result of fresh air inflow changes, airplane altitude changes, engine power setting changes or other conditions that can change the cabin altitude. For example, for an aircraft set to maintain a given course an altitude, the autopilot may make regular small changes in the engine power settings. Small changes in the power settings may cause the bleed air pressurization system, or a separate air compressor, used to pressurize the cabin to change how the system pressurizes the cabin. When the automatic portion of the CPCS is operating, the CPCS may change the motor position that adjusts the OFV position to compensate for these power setting, or other changes in the cabin air pressure. However, with a fixed manual control system, the pilot may have to activate the manual control of the valve frequently, which may distract the pilot from other aspects of flying the aircraft.

The cabin altitude expresses the cabin pressure in terms of an equivalent altitude. For example, a cabin altitude of zero (i.e., sea level) means that the cabin pressure is equal to the atmospheric pressure at sea level, which is approximately 14.7 psia, 1 bar, 100 kilopascals, or 760 mmHg. A cabin altitude of 5,000 feet means that the cabin pressure is equal to the atmospheric pressure at an altitude of 5,000 feet, which is approximately 12.2 psia, 0.54 bar, 54 kilopascals, or 410 mmHg.

A cabin pressure control system (CPCS) may include redundant systems and safety features to prevent over pressurization or under pressurization of the cabin. In some examples, an aircraft may have back-up electronics, two outflow valves, may have one or more safety valves and may have fault detection to switch the automatic control to manual control by the flight crew.

In a second example, a backup motor (sometimes used by the automatic control system) may be controlled by a control unit, utilizing inputs from the pilots for selected cabin altitude or selected cabin altitude rate of change. This system may require flight deck analog or digital interfaces to the CPCS. For example, the manual control of the CPCS may be implemented by adding softkeys or controls to the multi-function display (MFD) or other controls and/or displays on the flight deck. Integrating the CPCS manual controls into one or more other flight deck systems may take flight deck area, e.g. a flight crew may be required to switch back and forth between screen views for the CPCS controls. Integrating CPCS manual controls into other flight deck systems may require custom installations and may be expensive relative to the first method described above. Different aircraft customers and manufacturers may require different methods to implement manual CPCS interface, which may add system integration costs during the development of an airplane.

In other examples, a pneumatic system may be used. In the pneumatic system, when the auto control fails, the cabin altitude may be "held" until the pilot manually adjusts the cabin altitude using a pneumatic valve. Pneumatic systems may have some undesirable features such as they may be more expensive, more difficult to install, and they utilize pneumatic tubing from the flight deck control to the outflow valve. The pneumatic tubing may have reliability issues, such as leakage, may be significantly heavier than wiring and the pneumatic switches may not be as reliable as all-electric manual control.

In contrast to the pneumatic system, or softkey controls in the MFD, the system of this disclosure provides all-electric manual control of the OFV, using simplified pilot controls (a simple switch), such that after an automatic control failure, the cabin altitude is "held" until the pilot manually adjusts it. The closed loop control to maintain the cabin pressure is independent from the automatic pressure control system. The manual control panel of the system of this disclosure uses a simple, intuitive interface that may reduce pilot workload by reducing the need to either pay close attention to the cabin pressure or to switch back and forth between other flight deck controls to monitor the cabin pressure.

In this disclosure, any space within an aircraft, or similar vehicle, may be monitored and controlled by a CPCS of this disclosure. Some examples of spaces within a vehicle may include an aircraft cabin, a cockpit, control booth, a hold or storage space of a vehicle, and similar spaces. In some examples, a vehicle cabin may include seating for a passengers as well as locations for cargo. In some examples a cockpit or control booth may be where a vehicle operator, such as a flight crew, controls the operation of the vehicle. In this disclosure, any reference to controlling cabin pressure may also refer to controlling cockpit pressure, or any other space within a vehicle, unless otherwise specifically noted.

FIG. 1 is a block diagram illustrating an example of a CPCS according to one or more techniques of this disclosure. CPCS 100 may be part of an aircraft such as an airplane, a helicopter, or a weather balloon. Alternatively, CPCS 100 can be part of a space vehicle such as a satellite or spaceship.

In the example of FIG. 1, CPCS 100 controls and monitors the pressure of a fluid in a cabin. The cabin may be the passenger compartment of a vehicle, such as the galley and/or cockpit of an aircraft, which is filled with air. Air pressure is related to air density, so human lungs must work harder at lower air pressures, as compared to higher air pressures, to ingest enough oxygen. Thus, for the occupants of the cabin, it is important to maintain a sufficiently high fluid pressure (e.g., air pressure). CPCS 100 can also include one or more sensors for sensing the pressure of the fluid in the cabin, or for sensing the atmospheric pressure outside of the cabin. The pressure sensors may send one or more pressure sense signals 126 to manual monitor controller (MMC) unit 122 and automatic control unit 112. In some examples, pressure sense signals 126 may be implemented by tubing, or similar structure, that may connect the cabin directly to a pressure transducer, which converts the pressure to an electrical signal. In other examples, a pressure sensor may measure the cabin pressure and send an electrical signal indicating the measured pressure to MMC 122 and automatic control unit 112.

CPCS 100 may also receive valve position signals 154 from valve position circuitry within valve gearbox 152 for sensing the position of OFV 150. The airplane may also include an inflow valve for allowing fluid to flow into the cabin, e.g. from an engine bleed air system or other such system (not shown in FIG. 1).

Microcontroller 110, via automatic control unit 112, automatically controls the pressure of the fluid in the cabin based on a sensed cabin pressure. Automatic control unit 112 may operate with a closed feedback loop. Microcontroller 110 can receive a signal indicating the cabin pressure 126 and determine whether to open or close OFV 150 based on the signal. Microcontroller 110 may be configured to deliver signals to a motor driver that controls the operation of first motor 130. Microcontroller 110 can also receive a pressure sensor signal 126 indicating the pressure of the fluid and control motor 130 based on the pressure sensor signal 126. In examples in which the pressure sensor signal indicates that the cabin pressure is greater than an upper threshold, microcontroller 110 can control motor 130 to open OFV 150 to release fluid and lower the cabin pressure. In examples in which the pressure sensor signal indicates that the cabin pressure is less than a lower threshold, microcontroller 110 can control motor 130 to close OFV 150 to prevent the release of fluid from the cabin. Microcontroller 110 can also be coupled to an avionics system of the aircraft to receive control signals from the avionics.

Microcontroller unit (MCU) 120, of MMC unit 122, controls the pressure of the fluid in the cabin based on pilot inputs using the manual control panel 160. Manual control panel 160 may include any type of momentary switch include flipping a switch, pressing a button or a key, turning a knob, and/or touching a screen. In some examples, CPCS 100 may include a first switch that allows for a user to select an increased or decreased cabin pressure and a second switch that allows the user to select a dump operation. MMC 122 can open or close OFV 150 based on the status of the first switch. MMC 122 may open the OFV 150 in response to detecting that the user has actuated the dump switch. MMC unit 122 may be configured to refrain from driving motor 140 in response to detecting that manual control panel 160 does not indicate that the user selected manual operation.

In some examples, microcontroller 110 and MCU 120 may include computer readable storage in the form of a memory. In other examples, microcontroller 110 and MCU 120 may also be operatively connected to a memory external to microcontroller 110 or MCU 120 (not shown in FIG. 1). Either internal or external memory may include programming instructions for the processing circuitry within microcontroller 110 and MCU 120. The memory may also store and retrieve data, values, flags, setpoints, etc. that may be used by microcontroller 110 and MCU 120.

Motors 130 and 140 are configured to control the position of OFV 150. Each of motors 130 and 140 may be able to open or close OFV 150. In some examples, motor 130 includes a brushless direct-current (BLDC) motor, and motor 140 includes a brushed direct-current (BDC) motor. However, either of motors 130 and 140 may include a BLDC motor or a BDC motor. Each of motors 130 and 140 can control OFV 150 through a single, shared actuator or valve gearbox 152. Valve gearbox 152 may be configured as a differential gear box such that either or both of motors 130 or 140 may control the position of OFV 150.

OFV 150 can release fluid from the cabin based on the state of OFV 150. For example, OFV 150 can include a butterfly valve that can rotate to increase or decrease the fluid flow rate through OFV 150. OFV 150 may be positioned within the bulkhead of an aircraft and may be in flow communication with the cabin air and the outside ambient atmosphere. A position sensor in valve gearbox 152 may sense the position of OFV 150. In other examples, position sensor near OFV 150 can sense the position of OFV 150 and deliver a signal 154 to microcontroller 110 and/or 120.

MMC unit 122 of CPCS 100 may include a closed loop system to adjust the cabin pressure when in manual mode. The manual mode closed loop system is independent from the pressure control system in automatic control unit 112. Manual control panel 160 may include an electric switch configured to open and close one or more electrical connections to control electric motor 140 and thereby control OFV 150. The processing circuitry of MMC unit 122, i.e. MCU 120, may be configured to receive a pressure sense signal 126 indicating a pressure of the cabin, via monitoring circuitry 124. Monitoring circuitry 124 may contain circuitry configured to convert the pressure sense signal 126 into an electrical signal, pressure limiting circuitry, and an override function to ensure cabin pressure does not drop below a predetermined threshold.

In response to the alternate position mode switch in manual control panel 160 being set to the manual position, and the momentary switch in manual control panel 160 resting in the hold position, MCU 120 may determine the commanded target first pressure of the cabin when the electric switches were set to the manual AND hold positions using a typical MCU operational cycle by cycle sample (of the pressure sense signal 126) and then hold (of the pressure signal 126) method. MCU 120 may send electric signals to motor driver circuitry for motor 140 to control motor 140 to maintain the pressure of the cabin at the set pressure by controlling the position of OFV 150. MCU 120 may be configured to maintain the cabin at the first pressure (targeted pressure) within a threshold range, such as plus or minus 0.23 kilopascals, or in some examples, plus or minus 70 feet of altitude.

The system of this disclosure enables a cabin altitude "hold" function after failure of automatic CPCS control, using a separate, dissimilar control means from automatic control. Other examples of all-electric systems may not have a hold function when in manual mode, or may invoke the need for more complex controls in the flight deck to select cabin altitude or cabin altitude rate of change during semi-automatic control.

The system of this disclosure may provide technical benefits compared to existing systems. For example, a pilot may not have to divert attention to maintaining the cabin altitude because the closed loop feature of the manual system may be configured to hold the cabin altitude even without pilot interaction. Furthermore, the system uses a simple flight deck climb/descent switch (what many all-electric systems already include), instead of complex flight deck controls to manually select the cabin altitude or cabin altitude rate of change, which may have cost and weight benefits.

Cost benefits may also result from no semi-automatic selector panel (i.e. instead just a momentary switch), no additional weight (which has a fuel savings cost impact), and no added engineering costs to develop the flight deck selector panel. Finally, the system of this disclosure may have cost, weight, and reliability advantages over electro-pneumatic systems that may include a hold function.

Figure 2A:
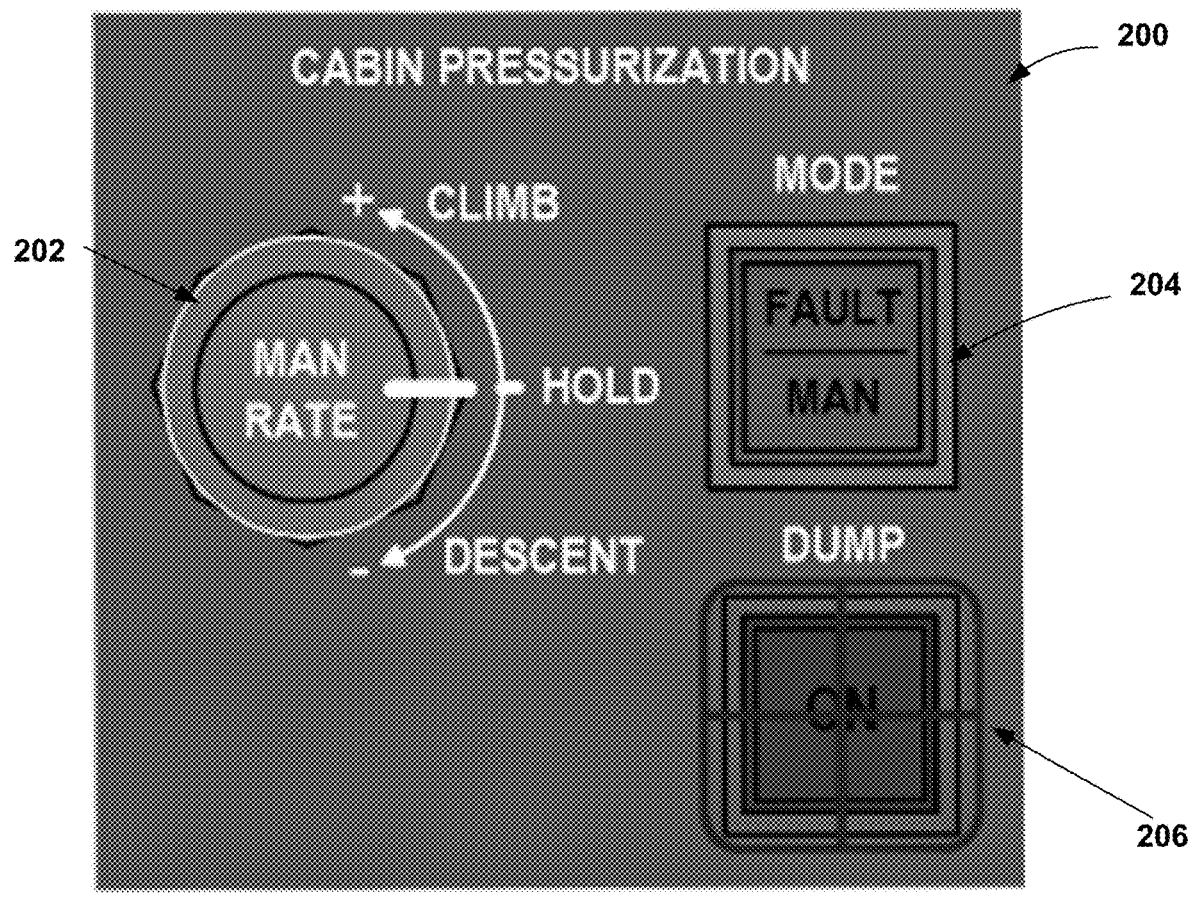
FIG. 2A is a conceptual diagram illustrating an example manual control panel according to one or more techniques of this disclosure.

FIG. 2A is a conceptual diagram illustrating an example manual control panel according to one or more techniques of this disclosure. Manual control panel 200 is an example implementation of manual control panel 160 described above in relation to FIG. 1.

Manual control panel 200 may include a valve control knob 202, a mode button 204 and a dump switch 206. Mode button 204 may have a fault indicator as well as a manual indicator. In response to a fault signal from the automatic pressure control unit, the fault indicator may illuminate. The pilot may then press, or otherwise activate the manual mode, which may cause the manual indicator (MAN) to illuminate and activate valve control knob 202. Valve control knob 202 may be a spring loaded, momentary switch configured to send a signal to an MMC unit, e.g. MMC unit 122 described above in relation to FIG. 1. When a flight crew member moves valve control knob 202 to the climb position, the signal to the MMC unit may cause an electric motor to cause an OFV, e.g. OFV 150 described above in relation to FIG. 1, to move to a more open position, thereby releasing cabin pressure. When a flight crew member moves valve control knob 202 to the descent position, the signal to the MMC unit may cause an electric motor to cause the OFV, to move to a more closed position, thereby preventing cabin pressure from being released. When released to the hold 244 position, the signal to the MMC unit may activate closed loop control of the cabin pressure. The closed loop control may maintain the cabin pressure at a pressure setpoint by receiving an indication of cabin pressure from the pressure sensor and operating the OFV to maintain that cabin pressure. In some examples, the cabin pressure setpoint may be set dynamically, e.g., the setpoint may be the measured pressure at the time the flight crew released the valve control knob to the hold position. In other examples, Dump switch 206 may also include a guard to prevent accidental actuation of the dump feature. When dump switch 206 is activated, the OFV may open completely, equalizing the pressure inside the cabin to the outside air pressure. The dump switch may be activated, for example, after landing an aircraft.

In some examples a CPCS of this disclosure may include a ditch switch (not shown in FIG. 2A). A ditch switch may cause the OFV to close completely, which may prevent water from entering the cabin in the event of an emergency water landing.

Figure 2B:
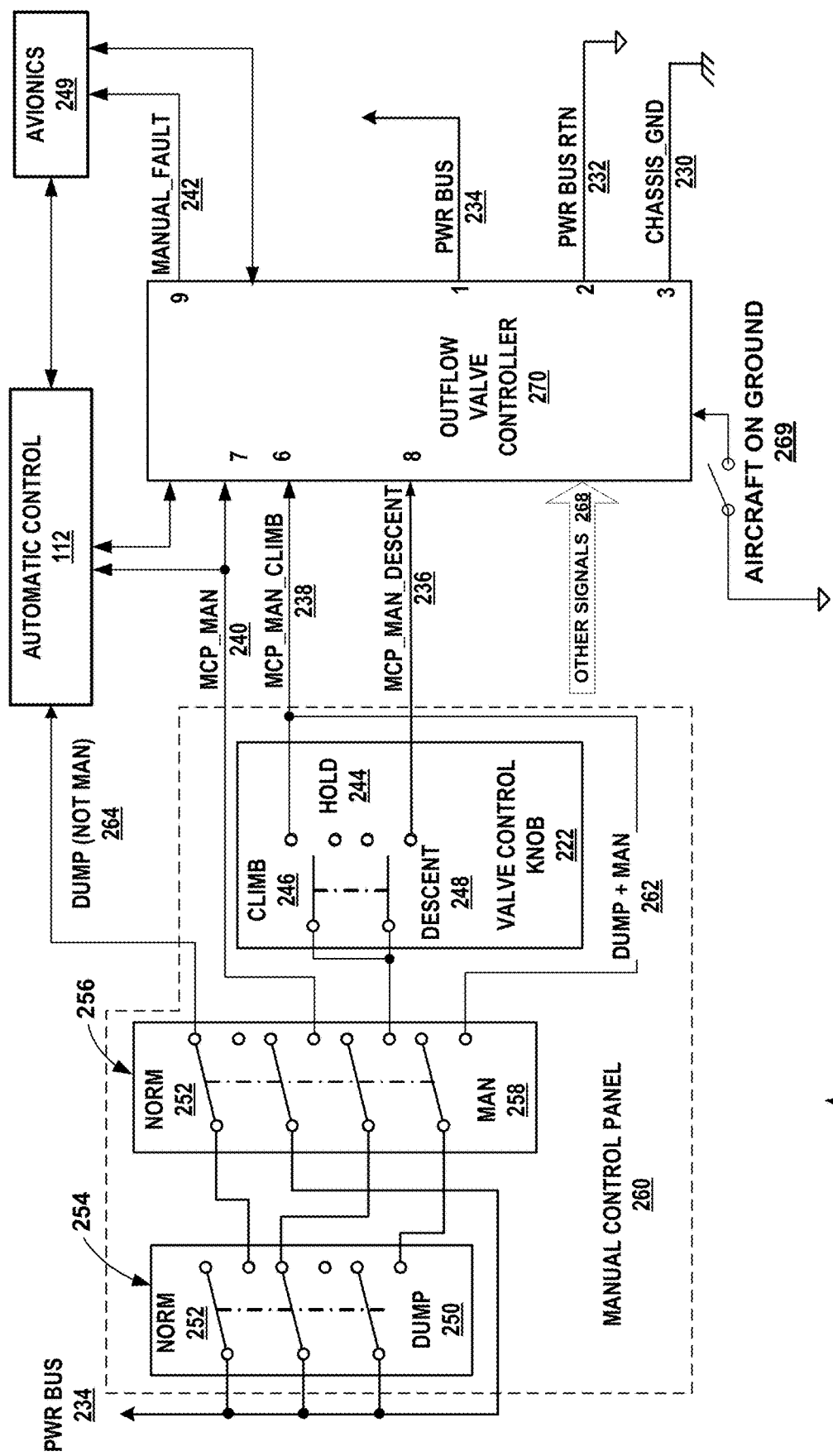
FIG. 2B is a schematic diagram illustrating an example manual control panel and CPCS according to one or more techniques of this disclosure.

FIG. 2B is a schematic diagram illustrating an example manual control panel and CPCS according to one or more techniques of this disclosure. CPCS 220 is an example of CPCS 100 described above in relation to FIG. 1. Manual control panel 260 is an example schematic implementation of manual control panel 160 and manual control panel 200 described above in relation to FIGS. 1 and 2A respectively. In the example of FIG. 2B, manual control panel 260 is configured such that a flight crew of the aircraft has access to and controls the electric switches on manual control panel 260.

When mode switch 256 is activated, the switch connections move from the normal 252 position in which automatic control unit 112 monitors and controls cabin pressure, to manual mode 258, in which the manual control panel sets the OFV position. Once released to the hold position 244, the closed loop pressure control of the MMC unit maintains the cabin pressure, while in flight. In some examples, functions of the MMC unit, e.g. MMC unit 122 described above in relation to FIG. 1, may be included in OFV controller 270. The MCP_MAN signal 240 may indicate to automatic control unit 112 and OFV controller 270 that CPCS 220 is in manual mode.

OFV controller 270 and automatic controller unit 112 may also be in communication with avionics systems 249. OFV controller 270 may, for example communicate one or more faults to avionics 249 d, such as manual fault 242.

As described above in relation to FIG. 1, moving valve control knob 222 to the climb position 246 sends a climb signal 238 to OFV controller 270, releasing cabin pressure. Moving valve control knob 222 to the descent position 248 sends a descend signal 236 to OFV controller 270, moving the OFV to a more closed position and reducing the rate of releasing cabin pressure.

Moving the guard and activating dump switch 254 may cause the switch connections of dump switch 254 to move from the normal 252 position to the dump position 250, which sends a dump signal 264 to automatic control unit 112, which will control the operation of the OFV valve via OFV valve controller 270. If CPCS 220 is in manual mode, activating the dump switch causes dump signal 262 to open the OFV by sending a climb signal 238 to the OFV controller 270. OFV controller 270 may receive other indications and signals 268 from the aircraft. Some examples may include door sensors, limit signals, and similar signals.

In manual operation, when the airplane is in flight, the OFV is controlled by the independent manual/monitor controller to hold the cabin to an approximately constant cabin pressure. Approximately constant may indicate within a predetermined threshold pressure range. When manual is selected and the airplane is in flight, the pilot may manually open or close the OFV by actuating the appropriate CLIMB/DESCENT toggle switch in the CLIMB or DESCENT position. When the switch is released, the cabin will go back to the manual-HOLD condition and the closed loop pressure system of the MMC unit will maintain the cabin pressure at the pressure of the cabin when the switch was released to HOLD, while the aircraft is in flight.

In manual operation, when the airplane is on the ground, no manual hold function is utilized; instead, the OFV remains in a fixed position as commanded by the valve control knob 222. In some examples outflow valve controller 270 may include a signal indicating that the aircraft is on the ground 269. For example, the aircraft on ground switch 269 may be controlled by a weight sensor, indicating the weight of the aircraft is on the wheels.

Valve position, end-of-travel status, cabin pressure, and cabin pressure rate feedback to the pilot are all available to be used to modulate the valve as required. Manual control will be overridden by the dump command, the altitude limit function, or the positive pressure relief valve The functions of FIG. 2B may also be illustrated by the following table:

| MODE Switch | DUMP Switch | DITCH Switch | OFV Function | Mode Indicator |
|---|---|---|---|---|
| NORM | NORM | NORM | Auto control | Dark |
| NORM | NORM | NORM | Auto control faulted, waiting on selection to MAN | FAULT Illuminated |
| MAN | NORM | NORM | MAN - closed-loop "hold" of cabin altitude Pilot control of OFV open or close | MAN Illuminated |
| NORM | ON | NORM | AUTO control of dump | Dark |
| MAN | ON | NORM | OFV opens at fixed speeds to altitude limit override threshold | MAN Illuminated |
| NORM | NORM | ON | OFV closes, first ensuring ~0 psid, to ensure no ingress of water | Dark |
| MAN | NORM | ON | OFV closes at fixed speeds - no regard to pressure (unless DP of safety valve is reached) | MAN Illuminated |

Figure 2C:
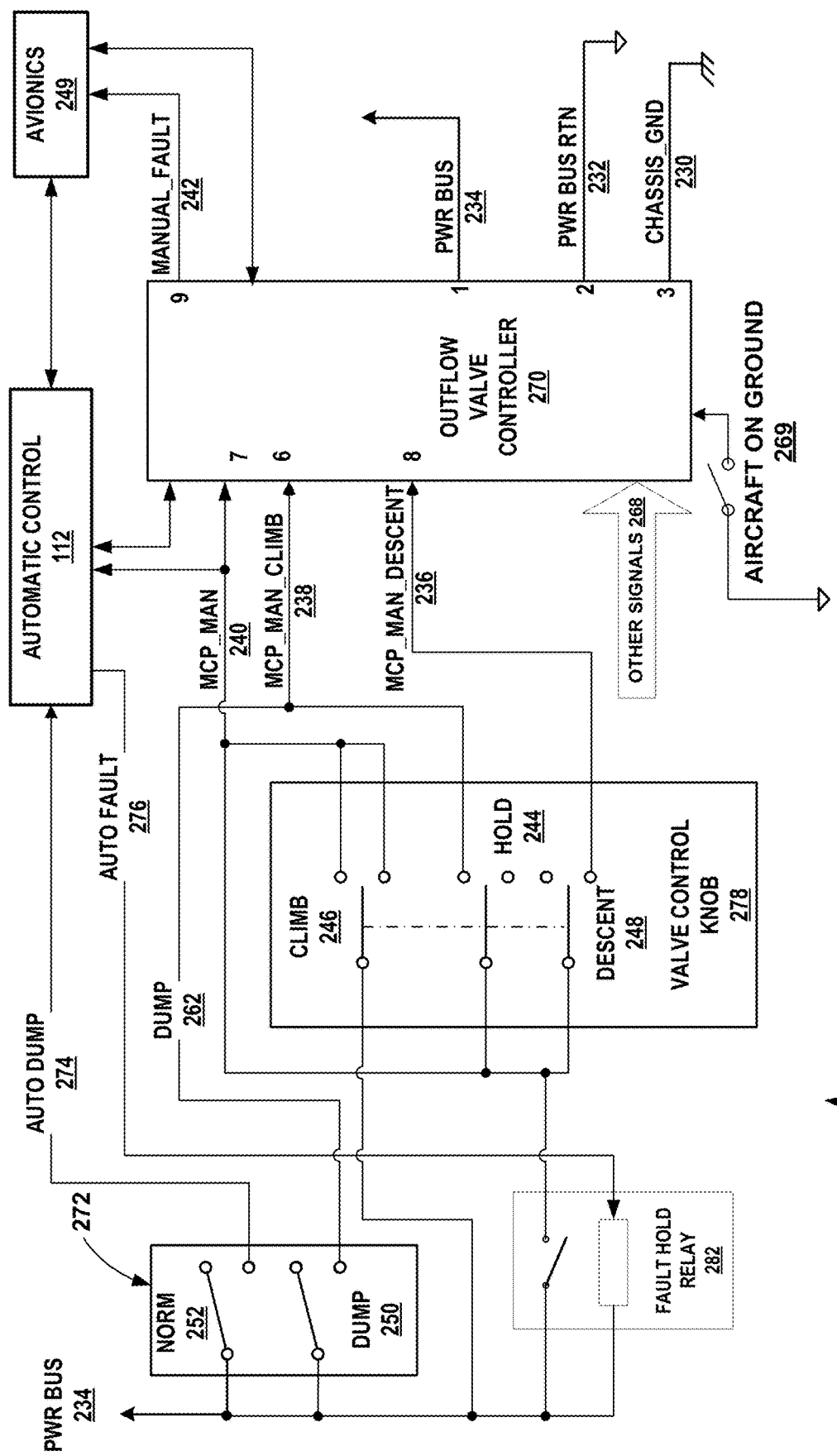
FIG. 2C is a schematic diagram illustrating an example CPCS with a fixed altitude pressure setting according to one or more techniques of this disclosure.

FIG. 2C is a schematic diagram illustrating an example CPCS with a fixed altitude pressure setting according to one or more techniques of this disclosure. CPCS 280 is an example of CPCS 100 described above in relation to FIG. 1, but the manual control panel a maintenance panel and not available during flight. Instead, a problem with the automatic control system may trigger CPCS 280 to maintain pressure altitude to a predetermined fixed altitude. In contrast to CPCS 220, control of the cabin pressure is not available to the flight crew while the aircraft is flying. Instead manual control panel 278 is only available during ground maintenance, such as when testing the aircraft pressure system. CPCS 280 may be desirable in applications such as single pilot aircraft or military aircraft.

Reference numbers in CPCS 280 including outflow valve controller 270, automatic control unit 112, avionics 249, power bus 234, aircraft on ground switch 269, other signals 268, as well as signals including MCP Man signal 240, descend signal 236, climb signal 238. that are the same as those in FIGS. 1-2B above have the same functions, description and characteristics as described above in relation to FIGS. 1-2B.

Dump switch 272 connects to power bus 234. When in the normal position 252, the switches of dump switch 272 are open. As described above in relation to FIG. 2B, activating dump switch 272 may cause the switch connections of dump switch 272 to move from the normal 252 position to the dump position 250, which sends auto dump signal 274 to automatic control unit 112. In automatic mode, automatic control unit 112 may control the operation of the OFV valve via OFV valve controller 270 to dump pressure. If CPCS 280 is in manual mode, e.g. during maintenance, then activating the dump switch may cause dump signal 262 to open the OFV by sending a climb signal 238 to the OFV controller 270.

Fault hold relay 282 is shown in FIG. 2C in an energized, open position. When closed, fault hold relay 282 connects power bus 234 to MCP Man 240 signal line, as well as provides power to valve control knob 278. Fault hold relay 282 may close automatic control unit 112 sends a fault signal on auto fault line 276.

In operation, outflow valve controller 270 may perform the manual HOLD function. As described above in relation to FIG. 2B, outflow valve controller 270 may include functions of MMC unit 122 depicted in FIG. 1. If the automatic control unit 112 has failed, i.e. malfunctioned, the OFV, outflow valve controller 270 may be configured to control the OFV to attempt to "hold" the cockpit pressure to the value that was present at the time of the failure. In some examples, outflow valve controller 270 may be configured to hold the cabin pressure to a predetermined fixed value, such as 8000 ft (approximately 10.9 psia), or some other predetermined fixed pressure. In the example of FIG. 2C, valve control knob 278 may be set to the hold position 244 on the ground at the end of a maintenance operation, before beginning flight operations.

In some examples the hold function may regulate the cabin pressure until one of three conditions occur. First, the airplane may climb and reach a maximum differential cabin-to-atmosphere pressure. The maximum differential pressure may be controlled by a cabin safety valve, such as safety valve 352 and safety valve 452 depicted in FIGS. 3 and 4. Therefore, the cabin pressure may follow the aircraft altitude to maintain the maximum differential pressure. As one example, maximum differential pressure may be preset to approximately five to six psid.

Second, the aircraft may descend below the predetermined hold altitude. Outflow valve controller 270 may be configured to open the OFV and equalize the cabin pressure to the outside air pressure. Finally, should CPCS 280 detect loss, or a significant reduction, of air inflow, then outflow valve controller 270 may be configured to close the OFV to attempt to retain cabin air pressure.

Figure 3:
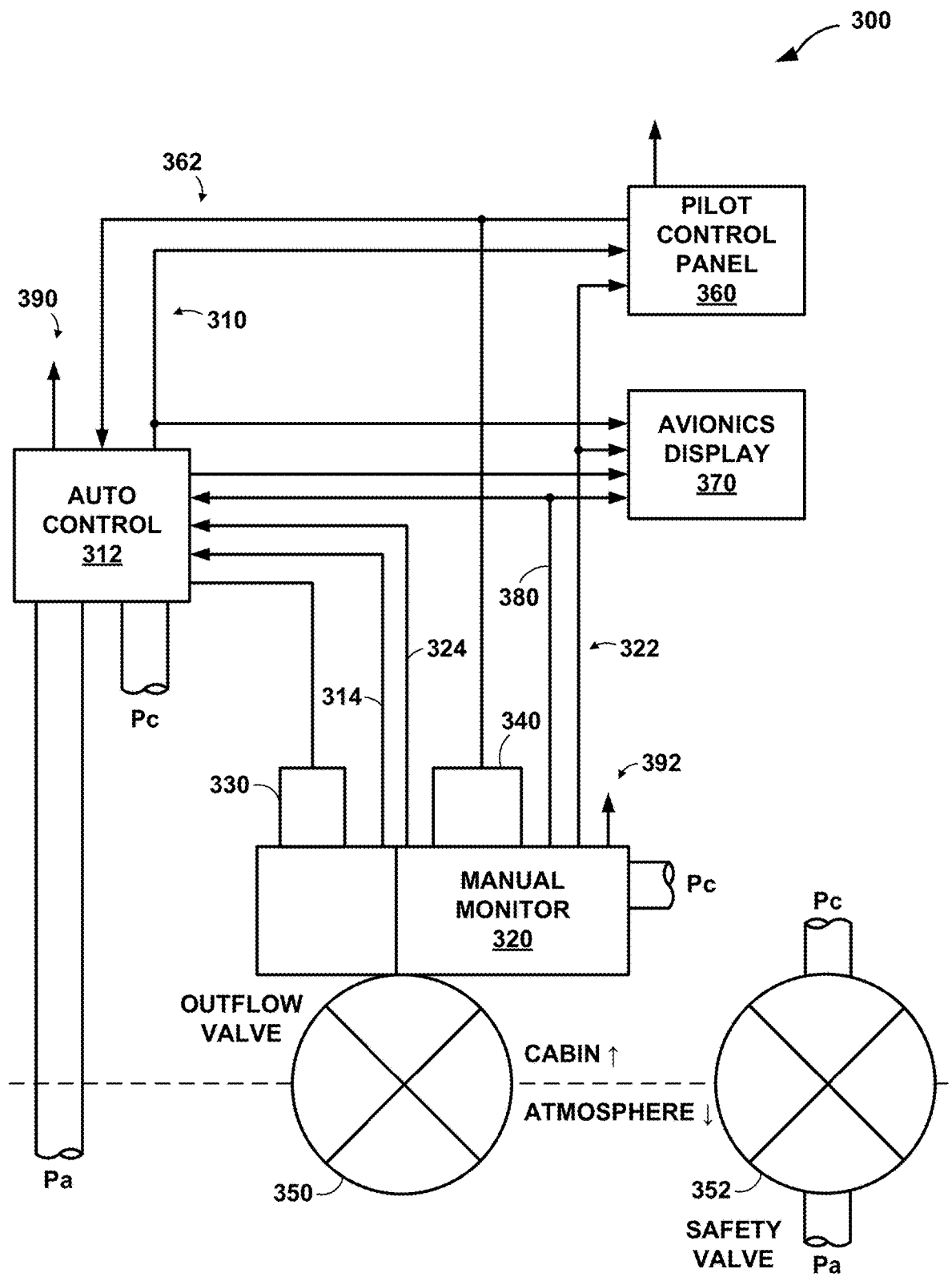
FIG. 3 is a conceptual block diagram of the system architecture of a CPCS, in accordance with some examples of this disclosure.

FIG. 3 is a conceptual block diagram of the system architecture of a CPCS, in accordance with some examples of this disclosure. CPCS 300 includes automatic control unit 312 and MMC unit 320, motors 330 and 340, outflow valve 350, safety valve 352, pilot control panel 360, and avionics display 370. Pilot control panel 360 may include manual control panel 160, 200 and 260 described above in relation to FIGS. 1, 2A and 2B. ↑↓

In the example of FIG. 3, automatic control unit receives power from power supply 390, which may be separate from power supply 392 for MMC unit 320 and pilot control panel 360. Automatic control unit 312 also receives manual operation signal 362 from pilot control panel 360, position signal 314 from the actuator that drives outflow valve 350, and altitude limit signal 324 and sensed pressure signal 380 from MMC unit 320. Automatic control unit 312 can output fault signal 310 to pilot control panel 360 and avionics display 370 in response to detecting a fault in automatic control unit 312 or motor 330. Automatic control unit 312 may receive signals indicating the cabin pressure (labeled "Pc") and the atmospheric pressure (labeled "Pa"). Automatic control unit 312 can also control outflow valve 350 through motor 330.

MMC unit 320 receives power from power supply 392, which may be the same power supply received by pilot control panel 360, and manual operation signal 362 from pilot control panel 360. MMC unit 320 can output fault signal 322 to pilot control panel 360 and/or avionics display 370 in response to detecting a fault in MMC unit 320 or motor 340. MMC unit 320 may receive a signal indicating the cabin pressure (labeled "Pc") and can control outflow valve 350 through motor 340.

Figure 4:
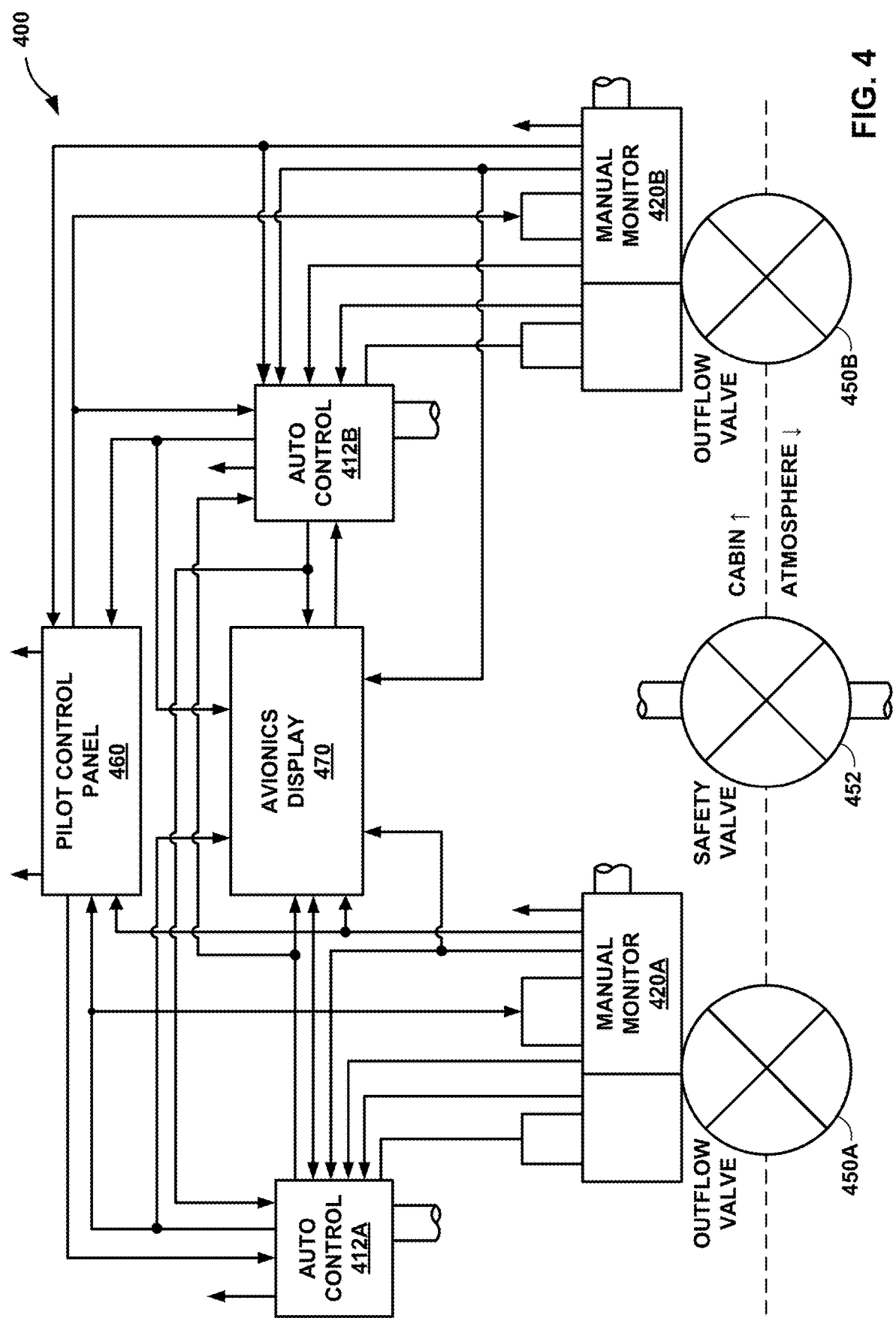
FIG. 4 is a conceptual block diagram showing of a two-valve implementation of a CPCS, in accordance with some examples of this disclosure.

FIG. 4 is a conceptual block diagram showing of a two-valve implementation of a CPCS, in accordance with some examples of this disclosure. CPCS 400 includes two outflow valves 450A and 450B to release fluid from two areas in a cabin. For example, an aircraft may have a first outflow valve positioned near the restroom at the front of the aircraft and a second outflow valve positioned near the restroom at the back of the aircraft. CPCS 400 also includes safety outflow valve 452 to provide one more option for releasing fluid from the cabin.

Similar to the components of cabin pressure control and monitoring system 300 shown in FIG. 3, automatic control units 412A and 412B receives a manual operation signal from pilot control panel 460. Automatic control units 412A and 412B can output fault signals to pilot control panel 460 and avionics display 470 in response to detecting a fault in, for example, with a microcontroller of automatic control units 412A or 412B or with a motor. In addition, automatic control units 420A and MMC unit 420B can output a fault signal to pilot control panel 460 and/or avionics display 470 in response to detecting a fault in a microcontroller or a motor. Automatic control units 412A and MMC unit 420A can control outflow valve 450A, and automatic control units 412B and MMC unit 420B can control outflow valve 450B. As with safety valve 352 depicted in FIG. 3, safety valve 452 may be set to release cabin pressure when the cabin pressure exceeds a predetermined threshold.

Figure 5:
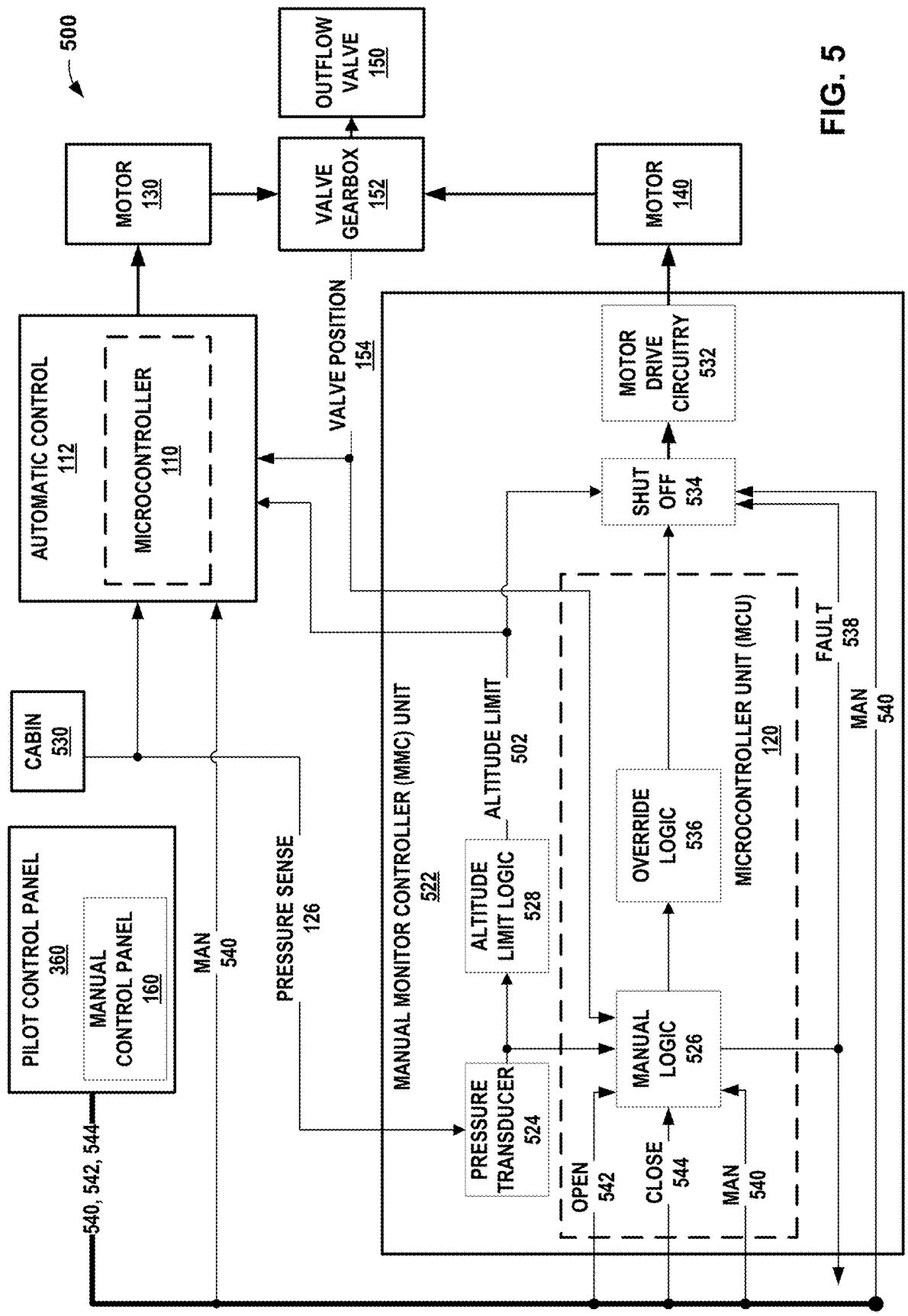
FIG. 5 is a block diagram illustrating details of an example implementation of a manual monitor controller unit as part of a CPCS according to one or more techniques of this disclosure.

FIG. 5 is a block diagram illustrating details of an example implementation of a manual monitor controller unit as part of a CPCS according to one or more techniques of this disclosure. CPCS 500 is an example implementation of CPCS 100 described above in relation to FIG. 1. Reference numbers in CPCS 500 that are the same as those in FIGS. 1-4 above have the same functions and description.

Functions of MMC Unit 522 may be included in an OFV or an OFV controller, as described above in relation to FIGS. 2B and 2C. In the example of FIG. 5, microcontroller unit (MCU) 120 has manual logic unit 526 that performs the input processing of input signals from manual control panel 160, pressure transducer 524, altitude limit threshold detection, a built-in test unit (not shown in FIG. 5) and provides control commands to outflow valve 150 motor 140. Manual logic 526 may include processing circuitry similar to that described above in relation to FIG. 1. Pressure transducer 524, altitude limit logic 528, and override logic 536 may be examples of circuitry include as part of monitoring circuitry 124, described above in relation to FIG. 1.

MCU 120 may perform built-in test to detect invalid switch conditions of manual control panel 160. For example, if the manual control panel 160 provided an open command input signal 542 to open the outflow valve 150, but the actual manual control panel 160 mode switch was not set to manual and the manual signal 540 is not true, then the MCU 120 may flag a fault for the MMC 522 due to an invalid input of the open command input signal 542. In a similar manner, MCU 120 may perform other built-in tests to detect that the actual cabin pressure signal 530 is out of range, internal MMC 522 power supplies are not providing correct voltage, or motor 140 is not responding as commanded by MCU 120. If the MCU 120 detects that there is an MMC 522 fault, the MCU 120 sets the fault 538 signal to true. When the MCU 120 sets the fault signal 538 to true, the shut off function 534 may disable continued operation of the motor drive circuitry 532 from operating the motor 140, ensuring that unsafe motor 140 operation does not occur.

MMC unit 522 also receives manual signal 540 from the manual control panel 160. If the manual control panel is not selected to manual mode, the shut off function 534 is disabled preventing motor drive circuitry 532 from operating the motor 140, unless the altitude limit signal 502 is true. In this similar manner, the shut off function 534 may arbitrate if the MCU 120 may operate the motor drive circuitry 532 and motor 140 for situations of faults (above), manual, or altitude limit control functionality (see below).

In the example of FIG. 5, pressure transducer 524 is a device with associated circuitry, which measures the pressure sense signal 126 and converts it to a voltage (or other signal proportionally representative of cabin pressure 530) for used by the microcontroller unit MCU 120 manual control logic 526, and also by the altitude limit logic circuit 528. Cabin pressure 530 is an example of Pc, described above in relation to FIG. 3.

In operation, altitude limit logic 528 utilizes the cabin pressure signal from pressure transducer 524 to determining whether the actual cabin pressure 530 is less than the pre-programmed altitude limit threshold pressure. The altitude limit threshold pressure may be "pre-programmed" into the MMC unit 522 by using analog circuitry, digital potentiometer, non-volatile memory, or other mechanism that stores the altitude limit threshold pressure. If the actual cabin pressure 530 is less than the altitude limit threshold pressure, altitude limit logic 528 becomes active and sets altitude limit 502 signal to true. When altitude limit signal 502 is true, automatic control 122 microcontroller 110 receives this altitude limit signal 502 and identifies the condition to the airplane for flight crew situational awareness. When altitude limit signal 502 is true, automatic control 122 motor control circuitry disables itself to no longer operate motor 130.

When altitude limit signal 502 is true, that signal 502 is received by the shut off function 534, enabling the motor 140 to be operated by the MCU 120 even though the manual signal 540 is not true. The MMC unit 522 motor drive circuitry 532 can become enabled via the motor 140 shut off function 534 when the signal 502 is true at shut off function 534. This allows the MCU 120 to operate the motor 140 to the closed direction to reduce the amount of fluid flow out of the cabin. MCU 120 will also utilize cabin pressure signal 530 from pressure sense 126 to compare against a known altitude limit threshold pressure. If the MCU 120 determines that the cabin pressure signal 530 is less than the known altitude limit threshold pressure, the MCU 120 will actively control the motor 140 in the closed direction using the motor drive circuitry 532 which was enabled by the shut off function 534, when the altitude limit logic 528 set the altitude limit signal 502 to true. In other words, MMC unit 522 may include protection circuitry configured to limit the cabin pressure from exceeding a pressure threshold. In this disclosure, "exceeding a pressure threshold" may indicate preventing the cabin pressure from going above a high pressure threshold as well as preventing the cabin pressure from going below a low pressure threshold.

The circuitry of the MMC 522 unit hosts the cabin pressure sensor 524 and performs the altitude limit output 502 and override function 536 when the cockpit altitude exceeds a pre-determined value (e.g. 15,000 feet). Thus, the MMC 522 has its own power supply to support this function as described above in relation to FIGS. 3 and 4.

In the event of an altitude limit event, MMC unit 522 provides a signal 502 to the automatic control unit 112, which may include an automatic motor control (AMC) unit. The altitude limit event signal 502 may disable the automatic motor control of motor 130. MMC unit 522 also drives the manual motor 140 closed to limit further depressurization. The altitude limit closing speed may be "tuned" the to limit the initial overshoot to the altitude limit set-point and then "regulate" to that set-point.

The MMC circuit also performs manual CLIMB/DESCENT or DUMP of OFV 150 if the flight deck mode switches in the manual control panel 160 of the pilot control panel 360 are set to MAN or DUMP.

During MAN-OPEN (e.g. climb), MAN-CLOSE (e.g. descent), and DUMP control, OFV 150 is opened or closed to a scheduled motor speed. As one example the first few seconds is a slow motor speed, then the remaining valve opening is commanded at a higher motor speed. The purpose of the slow-to-fast schedule is to limit the initial pressurization/depressurization rate prior to ultimately closing/opening the OFV.

If required, altitude limit will override the DUMP function and limit the cockpit altitude. If the flight is above 15,000 feet, for example, after an initial overshoot the cockpit altitude may be limited to 15,000 feet, which is the US regulatory limit above which passengers require oxygen. In other examples, the "altitude limit override logic" 536 can be utilized to allow the DUMP function to completely open the OFV, even when the aircraft is above the 15,000 ft altitude limit threshold.

Figure 6:
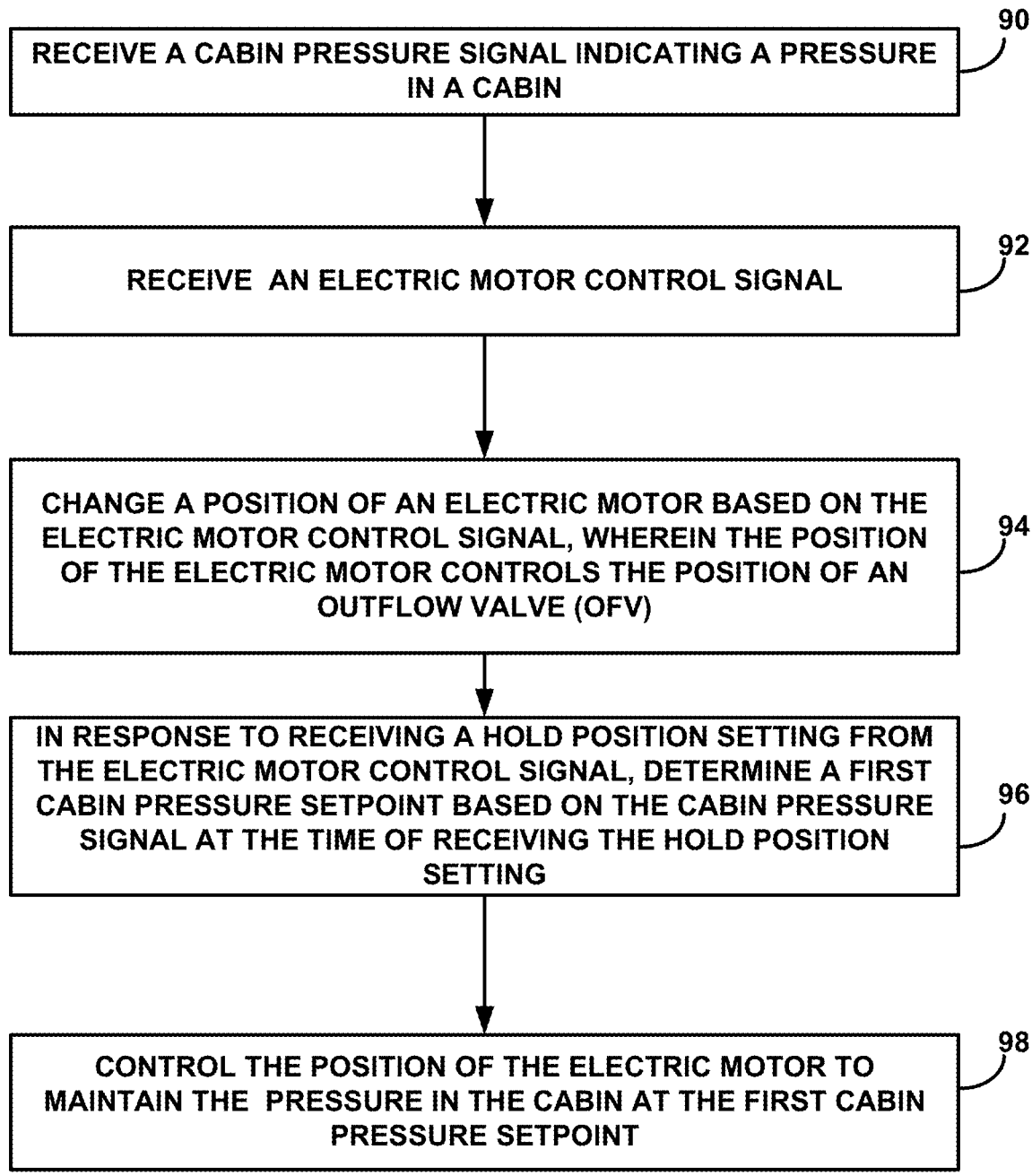
FIG. 6 is a flowchart illustrating an example operation of a manual control system according to one or more techniques of this disclosure.

FIG. 6 is a flowchart illustrating an example operation of a manual control system according to one or more techniques of this disclosure. The blocks of FIG. 6 will be described in terms of FIG. 1, unless otherwise noted.

Processing circuitry within the manual control system, e.g. MMC 122, may receive a cabin pressure signal 126 indicating a pressure in a cabin (90). In some examples the cabin pressure signal may be an air pressure received via tubing or some similar device an input to a pressure transducer within monitoring circuitry 124. The pressure transducer may convert the cabin pressure signal to an electrical signal indicating the cabin pressure. In other examples, a pressure transducer exposed to the cabin may convert the cabin pressure into an electrical signal which monitoring circuitry 124 may receive and transfer to MCU 120.

Processing circuitry, e.g. MCU 120, may receive an electric motor control signal from manual control panel 160, when in manual mode (92). MCU 120 may send drive signals causing a change in a position of an electric motor, e.g. motor 140, based on the electric motor control signal (94). For example, as described above in relation to FIGS. 2A-2C, manual control panel 160 may send a climb signal to MMC 122. In response, the electric motor may control the position of an outflow valve, e.g., OFV 150, to open and release pressure from the cabin.

In response to receiving a hold position setting from the electric motor control signal the processing circuitry may determine a cabin pressure setpoint (96). A hold position, such as hold position 244 described above in relation to FIGS. 2A-2C, may cause the processing circuitry to control the position of electric motor 140, and therefore OFV 150, to maintain the pressure in the cabin at the cabin pressure setpoint (98). For example, if the cabin air pressure increases above the cabin pressure setpoint, MNIC unit 1220 may open OFV 150 to release some pressure. In other examples, when the cabin pressure drops below the cabin pressure setpoint, MMC unit 122 may close OFV 150 to allow air inflow to increase the cabin pressure.

In some examples, the flight crew may have access to manual control panel 160 during flight to send motor control signals to MMC unit 122, as described above in relation to FIG. 2B. In other examples, manual control panel 160 may only be accessible as a maintenance panel, as described above in relation to FIG. 2B. When only accessed as a maintenance panel, should automatic unit 112 fail in flight, MMC unit 122 may determine the cabin pressure setpoint based on the existing cabin pressure at the time MMC unit 122 receives an indication that automatic control unit 112 has failed. For example, MMC unit 122 may receive auto fault signal 276, described above in relation to FIG. 2C, determine the existing cabin pressure based on pressure signal 126 and set the cabin pressure setpoint to the measured existing cabin pressure. In other examples, MMC unit 122 may determine the cabin pressure setpoint based on a predetermined fixed altitude such as 8000 feet (approximately 10.9 psia), 7000 feet (approximately 11.3 psia) or some similar setpoint.

In one or more examples, the functions described above may be implemented in hardware, software, firmware, or any combination thereof. For example, the MMC unit 122, MMC unit 320, outflow valve controller 270, automatic control unit 112, avionics 249 and other components that including processing circuitry may be implemented in hardware, software, firmware, or any combination thereof. If implemented in software, the functions may be stored on a tangible computer-readable storage medium and executed by a processor or hardware-based processing unit.

Instructions may be executed by one or more processors, such as one or more DSPs, general purpose microprocessors, ASICs, FPGAs, or other equivalent integrated or discrete logic circuitry. Accordingly, the term "processor," and "processing circuitry" as used herein, such as may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described Various examples of the disclosure have been described. These and other examples are within the scope of the following claims.

The invention claimed is:

1. A cabin air pressure control system, the system comprising:
 an outflow valve (OFV) configured to release pressure from a cabin;
 an electric motor configured to control a position of the OFV;
 an electric switch configured to control the electric motor;
 a manual monitor controller unit comprising first processing circuitry, the manual monitor controller unit is configured to:
  receive a signal indicating a pressure of the cabin; and
  in response to the electric switch being set to a hold position, determine a cabin pressure setpoint and control the electric motor to adjust the position of the OFV to maintain the pressure of the cabin based on the cabin pressure setpoint; and
 an automatic pressure control unit comprising second processing circuitry,
 wherein the first processing circuitry is configured to use closed loop control independent from the second processing circuitry to maintain the pressure of the cabin, and
 wherein the closed loop control is configured to maintain the pressure of the cabin at the cabin pressure setpoint based on the signal indicating the pressure of the cabin.

2. The system of claim 1, wherein the first processing circuitry is configured to determine the cabin pressure setpoint based on the signal indicating the pressure of the cabin.

3. The system of claim 2, wherein the cabin pressure setpoint is based on the signal indicating the pressure of the cabin at a time when the electric switch is set to the hold position.

4. The system of claim 2,
 wherein the first processing circuitry is configured to receive the signal indicating the pressure of the cabin in response to a determination that the automatic pressure control unit has malfunctioned, and
 wherein the cabin pressure setpoint is based on the pressure of the cabin at a time when the automatic pressure control unit malfunctioned.

5. The system of claim 1, wherein the first processing circuitry is configured to determine the cabin pressure setpoint based on a predetermined pressure setpoint.

6. The system of claim 1, wherein the first processing circuitry is configured to maintain the pressure of the cabin within a threshold range of the cabin pressure setpoint.

7. The system of claim 1, wherein the first processing circuitry is configured to determine the position of the OFV and to execute the closed loop control based on the position of the OFV.

8. The system of claim 7, further comprising valve position circuitry configured to determine the position of the OFV, wherein the first processing circuitry is configured to receive a signal indicating the position of the OFV from the valve position circuitry.

9. The system of claim 1,
 wherein the cabin air pressure control system is on board an aircraft, and
 wherein the electric switch is configured such that a flight crew of the aircraft controls the electric switch.

10. The system of claim 1,
 wherein the cabin air pressure control system is on board an aircraft, and
 wherein the electric switch is configured such that the electric switch is only accessible during ground operations.

11. A device for regulating a pressure of a cabin on an aircraft, the device comprising:

motor drive circuitry configured to control a position of an electric motor, wherein the electric motor controls a position of an outflow valve (OFV);

a manual monitor controller unit comprising first processing circuitry operatively connected to a memory, the manual monitor controller unit is configured to:

receive a pressure sense signal indicating the pressure of the cabin;

in response to receiving a motor control signal from an electric switch indicating a hold position, determine a cabin pressure setpoint and control the electric motor to adjust the position of the OFV to maintain the pressure of the cabin on the aircraft based on the cabin pressure setpoint; and an automatic pressure control unit comprising second processing circuitry, wherein the first processing circuitry is configured to use closed loop control independent from the second processing circuitry to maintain the pressure of the cabin, and wherein the closed loop control is configured to maintain the pressure of the cabin at the cabin pressure setpoint based on the signal indicating the pressure of the cabin.

12. The device of claim 11, wherein the first processing circuitry is configured to determine the cabin pressure setpoint based on the signal indicating the pressure of the cabin.

13. The device of claim 12, wherein the cabin pressure setpoint is based on a cabin pressure measured at a time the electric switch is set to the hold position.

14. The device of claim 11, wherein the first processing circuitry determines the cabin pressure setpoint based on a predetermined pressure setpoint.

15. The device of claim 11, further comprising protection circuitry configured to limit the cabin pressure from exceeding a pressure threshold.

16. A method for controlling a pressure in a cabin of a vehicle, the method comprising:

receiving, by a manual monitor controller unit comprising first processing circuitry, a cabin pressure signal indicating a pressure in the cabin and an electric motor control signal;

changing, by the first processing circuitry, a position of an electric motor based on the electric motor control signal, wherein the position of the electric motor controls a position of an outflow valve (OFV);

automatically controlling, by an automatic pressure control unit comprising second processing circuitry, the position of the electric motor based on the cabin pressure signal; and in response to receiving a hold position setting from the electric motor control signal, determining, by the first processing circuitry, a cabin pressure setpoint and controlling, by the first processing circuitry, the position of the electric motor to maintain the pressure in the cabin at the cabin pressure setpoint, wherein controlling the position of the electric motor to maintain the pressure in the cabin at the cabin pressure setpoint comprises using closed loop control independent from the second processing circuitry to maintain the pressure of the cabin at the cabin pressure setpoint based on the signal indicating the pressure of the cabin.

17. The method of claim 16, wherein the cabin pressure setpoint is based on the pressure in the cabin measured at a time the first processing circuitry receives the hold position setting.

18. The method of claim 16, wherein using the closed loop control to maintain of the pressure of the cabin includes comparing the cabin pressure signal indicating the pressure of the cabin to the cabin pressure setpoint, and wherein using the closed loop control to maintain the pressure of the cabin is in response to an indication of a malfunction in the automatic pressure control unit.

19. The method of claim 16, further comprising limiting, by the first processing circuitry, the pressure in the cabin from exceeding a pressure threshold.

* * * * *